United States Patent [19]

Mix

[11] Patent Number: 5,063,000
[45] Date of Patent: Nov. 5, 1991

[54] PACKING ELEMENTS

[76] Inventor: Thomas W. Mix, 28 Atwood St., Wellesley, Mass. 02181

[21] Appl. No.: 346,983

[22] Filed: May 3, 1989

[51] Int. Cl.$^5$ .............................................. B01F 3/04
[52] U.S. Cl. .................................. 261/94; 261/112.2; 261/DIG. 72; 366/337; 422/224; 428/182
[58] Field of Search ..................................... 261/94–98, 261/110, 112.1, 112.2, DIG. 72; 210/150; 202/158; 428/175, 176, 181, 182; 422/224, 310; 165/60, 166; 366/336–339; 55/90, 233

[56] References Cited

U.S. PATENT DOCUMENTS

| | | | |
|---|---|---|---|
| 1,887,704 | 11/1932 | Wilisch | 261/94 |
| 2,206,440 | 7/1940 | Walker | 261/112.1 |
| 3,051,453 | 8/1962 | Sluijters | 366/337 |
| 3,151,675 | 10/1964 | Lysholm | 261/112.2 X |

(List continued on next page.)

FOREIGN PATENT DOCUMENTS

| | | |
|---|---|---|
| 211999 | 3/1956 | Australia ........................ 261/112.2 |
| 717195 | 6/1968 | Belgium . |
| 566518 | 11/1958 | Canada . |
| 0069241 | 1/1983 | European Pat. Off. . |
| 0170402 | 2/1986 | European Pat. Off. . |
| 684870 | 12/1939 | Fed. Rep. of Germany ... 261/112.2 |
| 2060178 | 11/1971 | Fed. Rep. of Germany ... 261/112.2 |
| 2208226 | 9/1973 | Fed. Rep. of Germany . |
| 3140640 | 6/1982 | Fed. Rep. of Germany . |
| 3222892 | 12/1983 | Fed. Rep. of Germany . |
| 1026320 | 4/1953 | France . |
| 2130621 | 11/1972 | France ................................ 261/94 |
| WO84/02088 | 6/1984 | PCT Int'l Appl. . |
| 772572 | 10/1980 | U.S.S.R. . |
| 1311767 | 5/1987 | U.S.S.R. ......................... 261/DIG. 72 |
| 1004046 | 9/1965 | United Kingdom . |
| 1386955 | 3/1975 | United Kingdom . |
| 1573745 | 8/1980 | United Kingdom . |

OTHER PUBLICATIONS

"Performance Characteristics of New High Efficiency High Capacity Oriented Lamellar Packing (FLEX-IPAC)", Meier et al., National A.I.Ch.E. Meeting, 1977.

Van Winkle, *Distillation*, McGraw Hill, Inc. New York, 1967, p. 606.

Koch, Flexipac, "Tower Packing for Absorption, Distillation, Extraction, Heat Transfer, Biological Media for Aerobic and Anaerobic Water Purification", Bul. KFP-2.

Chem-Pro/Montz, "A$_2$/High Efficency/Low Pressure Drop Tower Packing", Bulletin HV-610.

Koch Sulzer Rectification Columns, Bulletin KS-1.

(List continued on next page.)

*Primary Examiner*—Richard L. Chiesa
*Attorney, Agent, or Firm*—Fish & Richardson

[57] ABSTRACT

A packing element for enhancing contact between a fluid having a predominant direction of flow and a second fluid, including: a plurality of layers, each layer having a generally flat portion disposed generally in a plane aligned with the direction of flow and having a plurality of fluid deflection surfaces that project from the plane, the deflection surfaces being oriented obliquely to the direction of flow in a manner selected to impart to different portions of liquid flowing on one side of the layer different components of momentum at different angles to the direction of flow, and to cause those different fluid portions to meet on that side of the layer in a region of the flat portion with a tendency to cancel the momentum components; the deflection surface on each layer are arranged to cause portions of the liquid flowing on one side of each layer to be transferred to another side of that layer and mixed with fluid flowing on the other side; and the layers are disposed adjacent to each other so that some of the deflection surfaces of one layer contact some of the deflection surfaces of an adjacent layer at a plurality of nodes, the contacting deflection surfaces being oriented in opposite oblique directions with respect to the direction of flow to cause portions of fluid flowing on the contacting deflection surfaces to meet at the nodes.

28 Claims, 7 Drawing Sheets

U.S. PATENT DOCUMENTS

| | | | |
|---|---|---|---|
| 3,235,234 | 2/1966 | Beaudoin | 261/24 |
| 3,266,787 | 8/1966 | Eckert | 261/94 |
| 3,433,692 | 3/1969 | Gewiss | 261/112.2 X |
| 3,485,485 | 12/1969 | Faigle | 261/112.2 |
| 3,589,687 | 6/1971 | Leybourne | 261/79.1 |
| 3,618,910 | 11/1971 | Arndt | 261/94 |
| 3,620,506 | 11/1971 | So | 366/337 |
| 3,664,638 | 5/1972 | Grout et al. | 366/337 |
| 3,679,537 | 7/1972 | Huber et al. | 261/100 X |
| 3,704,869 | 12/1972 | Priestley | 55/241 X |
| 3,752,453 | 8/1973 | Doyne | 261/94 |
| 3,775,234 | 11/1973 | Rich | 261/112.2 X |
| 3,887,664 | 6/1975 | Regehr | 261/112.2 |
| 3,963,810 | 6/1976 | Holmberg et al. | 261/112.2 |
| 3,997,632 | 12/1976 | Kloss | 261/103 |
| 4,027,058 | 5/1977 | Wootten | 428/181 X |
| 4,041,113 | 8/1977 | McKeown | 261/98 |
| 4,067,936 | 1/1978 | Ellis et al. | 261/98 |
| 4,128,684 | 12/1978 | Bomio et al. | 428/175 |
| 4,179,222 | 12/1979 | Strom et al. | 366/337 |
| 4,186,159 | 1/1980 | Huber | 261/112.2 |
| 4,195,043 | 3/1980 | Foote et al. | 261/94 |
| 4,197,264 | 4/1980 | Degg | 261/98 |
| 4,202,847 | 5/1980 | Ernst et al. | 261/161 |
| 4,203,934 | 5/1980 | Leva | 261/98 |
| 4,203,935 | 5/1980 | Hackenjos | 261/98 |
| 4,277,425 | 7/1981 | Leva | 261/98 |
| 4,296,050 | 10/1981 | Meier | 261/112.2 |
| 4,324,749 | 4/1982 | Bronner | 261/98 X |
| 4,333,892 | 6/1982 | Ellis et al. | 261/94 |
| 4,366,608 | 1/1983 | Nagoaka | 261/94 X |
| 4,374,542 | 2/1983 | Bradley | 165/166 |
| 4,396,058 | 8/1983 | Kurschner et al. | 165/166 X |
| 4,496,498 | 1/1985 | Pluss | 261/95 |
| 4,597,916 | 7/1986 | Chen | 261/94 |
| 4,600,544 | 7/1986 | Mix | 261/94 X |
| 4,604,247 | 8/1986 | Chen et al. | 261/94 |
| 4,670,196 | 6/1987 | Hsia | 261/112.2 |
| 4,701,287 | 10/1987 | Manteufel | 165/60 X |
| 4,710,326 | 12/1987 | Seah | 261/112.2 |
| 4,740,334 | 4/1988 | Rukovena, Jr. | 261/112.2 |

OTHER PUBLICATIONS

Chen et al., "Development of a New General of High Efficiency Packing for Mass Transfer Operations", Glitsch, Inc., Dallas, Tex., Nov. 14–19, 1982.

Norton, "Liquid Distributors", brochure, Dec. 1976.

Chem Show Preview, advertisement, Chemical Engineering, p. 144, #A479 (1983).

"Structured is the Byword in Tower-Packing World", Chemical Engineering, Mar. 4, 1985, pp. 22–25.

"Boosting Tower Performance by More than a Trickle", *Chemical Engineering*, May 27, 1985, pp. 22–27.

"Structured Packing", *The Chemical Engineer*, Aug. 1988, pp. 28–30.

PACKING ELEMENTS

BACKGROUND OF THE INVENTION

This invention relates to packing elements for enhancing contact between two fluids.

Packing elements are typically loaded into a reaction chamber (or washing column or distilling tower) and have surfaces for deflecting the flow of two fluids (e.g., a gas rising and liquid falling) in the chamber.

Some packing elements are meant to be loaded into the chamber in a particular orientation. For example, Huber et al., U.S. Pat. No. 3,679,537, disclose a cylindrical packing element which is loaded into a tubular chamber with a cylinder axis in line with the axis of the chamber. In one embodiment, each cylindrical packing element is made up of corrugated layers stacked so that the corrugations of adjacent layers cross each other. In another embodiment, a cylindrical packing element is formed by wrapping two overlaid sheets each having an impressed vee pattern. The vees of the two sheets have opposite orientations, and, when wrapped, vertices of the vees lie on a single plane normal to the axis of the cylinder.

Walker, U.S. Pat. No. 2,206,440, describes a heat transfer apparatus made up from a series of plates arranged in juxtaposition and in parallel planes to form screens. Pyramidal-like protuberances are provided at intervals along one surface of each plate. The protuberances are split to form sharp edged projections.

Lucien-Victor Gewiss, U.S. Pat. No. 3,433,692, describes a method for forming herringbone configurations for sandwich structures, said to be useful in heat exchangers. Sections from folded or corrugated sheets are cut and mated to form a corrugated herringbone configuration.

The layers of such packing elements may be made from various materials, for example, textile fabrics (i.e., guaze) stiffened by interwoven metal wires, metalic fabric, fiberglass, or sheet metal.

U.K. Patent 1,004,046, discloses perforating each corrugated layer by spaced apart oval perforations, and serrating the bottom edge of each layer.

SUMMARY OF THE INVENTION

One general aspect of the invention is a packing element for enhancing contact between a fluid having a predominant direction of flow and a second fluid, comprising: a plurality of layers, each layer including a generally flat portion disposed generally in a plane aligned with the direction of flow and having a plurality of fluid deflection surfaces that project from the flat portion out of the plane, the deflection surfaces being oriented obliquely to the direction of flow in a manner selected to impart to different portions of liquid flowing on one side of the layer different components of momentum at different angles to the direction of flow, and to cause those different fluid portions to meet on that side of the layer in a region of the flat portion with a tendency to cancel the momentum components; the deflection surfaces on each layer are arranged to cause portions of the liquid flowing on one side of each layer to be transferred to another side of that layer and mixed with fluid flowing on the other side; and the layers are disposed adjacent to each other so that some of the deflection surfaces of one layer contact some of the deflection surfaces of an adjacent layer at a plurality of nodes, the contacting deflection surfaces being oriented in opposite oblique directions with respect to the direction of flow to cause portions of fluid flowing on the contacting deflection surfaces to meet at the nodes.

Preferred embodiments include the following features.

One portion of the fluid deflection surfaces on each layer projects in one direction from the plane, and a second portion of the deflection surfaces projects in an opposite direction from the plane so that the first portion of the deflection surfaces of one of the layers contacts the second portion of the deflection surfaces of an adjacent layer at the nodes. Each layer includes one or more apertures through which fluid is transferred from one side of the layer to another side of the layer. The apertures are disposed between adjacent deflection surfaces.

In some embodiments, surfaces of each layer are finely fluted in a direction orthogonal to the direction of flow. The fine fluting is disposed on the deflection surfaces. In other embodiments, each layer includes a plurality of small-scale deflection surfaces oriented obliquely with respect to the direction of flow, the small scale deflection surfaces being arranged in a pattern on the layer that has a predetermined relationship (e.g, identical) to the pattern of the fluid deflection surfaces on the layer. The second fluid has a predominant direction of flow that is opposite to that of the other fluid.

A second aspect of the invention is a device for enhancing contact between a fluid having a predominant direction of flow and a second fluid, comprising a layer of material that includes a flat portion lying in a plane generally aligned with the direction of flow, the layer having a series of fluid deflection surfaces, adjacent deflection surfaces projecting in opposite directions from the plane of the flat portion; the series is positioned generally along a line lying in the plane and at an angle to the direction of flow, and each deflection surface is oriented obliquely to the direction of flow.

Preferred embodiments include the following features.

In one embodiment, each deflection surface meets the flat portion along a line segment, and successive line segments form a W-shape. The line along which the series of deflection surfaces is arranged is perpendicular to the direction of flow so that the series is disposed generally along a horizontal row with respect to the direction of flow. Alternatively, the line is parallel to the direction of flow so that the series of deflection surfaces is disposed generally along a vertical column with respect to the direction of flow.

Adjacent deflection surfaces provide an opening through the layer in the plane. A second series of deflection surfaces is disposed parallel to the first series and separated therefrom by the flat portion. The second series is offset with respect to the first series so that a straight line drawn perpendicular to the line of the series through the device intersects a center of the W shape in one series and intersects another part of the W shape in the second series. The deflection surfaces have a generally V shaped cross section and have a fold at the base of the V shape. The fold is oriented obliquely to the direction of flow.

When a plurality of these layers are disposed adjacent to each other, the folds of the deflection surfaces of one layer that project in one direction contact the folds of the deflection surfaces of an adjacent layer that project in the opposite direction at a plurality of nodes. These contacting folds are oriented at an angle to each other to define an X shape. When the line of the series is perpendicular to the direction of flow, this angle is preferably between 60° and 150°, and the angle is between 30° and 120° when the series is parallel to the flow direction; in both cases, the angle is most preferably 90° and the direction of flow bisects the angle.

In another embodiment, the line along which the series of deflection surfaces is arranged is generally diagonal (e.g., at 45°) to the direction of flow, and a region of the flat portion is disposed between adjacent deflection surfaces. A second series of deflection surfaces is disposed parallel to the first series and separated therefrom by part of the flat portion. Deflection surfaces of the first and second series are arranged in a different (e.g., perpendicular) directions. A region of the flat portion also separates adjacent deflection surfaces in the second series.

Openings are disposed between these deflection surfaces and the flat portion. The deflection surfaces have a generally V-shaped cross-section with a fold at the base of the V-shape. The folds are oriented obliquely to the direction of flow, and the folds of the first series are perpendicular to those of the second series. Thus, when a plurality of the layers are disposed adjacent to each other, the folds of the deflection surfaces in one series of one of the layers that project in one direction contact, at a plurality of nodes, the folds of the deflection surfaces of the other series on the other layer that project in the opposite direction. The contacting folds make an X-shape, and the direction of flow bisects the angle between the folds.

The layer includes at least one aperture, and surfaces of the layer are finely fluted in a direction orthogonal to the direction of flow. The fine fluting is disposed on the flat portion and the deflection surfaces.

As an alternative to the fine fluting, the layer includes a series of small-scale deflection surfaces projecting from the flat portion out of the plane, each small-scale deflection surface being oriented obliquely to the direction of flow and meeting the flat portion along a line segment, successive line segments forming a W shape. Adjacent small scale deflection surfaces project from the flat portion in opposite directions from the plane and provide an opening through the layer in the plane. Preferably, the series of small-scale deflection surfaces are disposed over the entire layer in the same pattern that the fluid deflection surfaces are disposed on the layer.

The layer also includes a set of deflection surfaces disposed in a region of the flat portion that separates the first and second series; the set of deflection surfaces projects from the region out of the plane, and each one of the set of deflection surfaces is oriented obliquely to the direction of flow and meets the flat portion along a line segment, successive line segments forming a V shape. Adjacent ones of the set of deflection surfaces project from the region on opposite sides of the plane. The set of deflection surfaces has a scale that is approximately one-half that of the series of fluid deflection surfaces and are positioned generally along a line that is parallel to the direction of flow.

Adjacent packing elements are disposed in the reaction chamber so that the plane of the layers of one of the packing elements is at a predetermined orientation (e.g., perpendicular) to the plane of the layers of the adjacent packing element. This orientation may be facilitated by securing an adjacent pair of the packing elements together and then inserting them as a unit into the reaction chamber.

The layer comprises any suitable material, such as sheet metal, guaze, metallic fabric, fiberglass, or ceramic material.

In another aspect, the invention features a reaction chamber for mixing a fluid having a predominant direction of flow with a second fluid, comprising: a plurality of packing elements for enhancing the mixing, each packing element comprising a plurality of adjacently disposed layers, each layer in each packing element including a generally flat portion disposed generally in a plane aligned with the direction of flow; each layer of each packing element has a plurality of fluid deflection surfaces that project from the flat portion out of the plane and which are oriented obliquely to the direction of flow in a manner selected to impart to different portions of liquid flowing on one side of the layer different components of momentum at different angles to the direction of flow, and to cause the different fluid portions to meet on the side of the layer in a region of the flat portion with a tendency to cancel the momentum components; the deflection surfaces are arranged to cause portions of the liquid flowing on one side of each layer to be transferred to another side of that layer and mixed with fluid flowing on that other side; and the layers are arranged so that some of the deflection surfaces of one layer contact some of the deflection surfaces of an adjacent layer at a plurality of nodes, the contacting deflection surfaces being oriented in opposite directions to cause portions of fluid flowing on the contacting deflection surfaces to meet at the nodes.

In yet another aspect, the invention features a method of making a layer for enhancing contact between a fluid having a predominant direction of flow and a second fluid, comprising providing a generally flat layer, forming a series of slits in the layer, and forming a series of fluid deflection surfaces bounded by the slits, adjacent deflection surfaces projecting in opposite directions from the plane of the flat portion, the series being positioned generally along a line lying in a plane of the flat layer and at an angle to the direction of flow, each deflection surface being oriented obliquely to the direction of flow.

Preferred embodiments include the following features.

The slits are formed by cutting or stamping the layer, or by passing the layer through a corresponding series of gears. The series of deflection surfaces are formed by stamping the layer, or by passing said layer through a corresponding series of gears.

Fine fluting is formed throughout the layer before forming the slits and forming the deflection surfaces. Alternatively, a series of small scale slits is formed throughout the layer, and a series of small-scale deflection surfaces are formed that are bounded by the slits, the small-scale deflection surfaces projecting from the flat layer and being oriented obliquely to the direction of flow, each small-scale deflection surface meeting the flat layer along a line segment, successive line segments forming a W shape.

One or more secondary slits are formed perpendicular to the series of slits prior to forming the series of deflection surfaces. The secondary slits meet the series of slits, and some of the secondary slits are disposed in the regions where the folds of the deflection surfaces will be formed. The secondary slits serve to relieve stresses in the layer that are exerted when the layer is deformed to form the deflection surfaces.

Each layer enhances contact between two fluids moving in opposite directions. The fluid streams meet head-on at the points of contact between folds of adjacent layers, causing sideways movement of each fluid. The apertures in each layer promote good distribution of the fluids and efficient mass transfer and heat exchange, especially when oriented to interfere with fluid channeling in the troughs of each layer. The fine fluting and fine scale deflection surfaces further improve liquid distribution. In the W-shape pattern with the layers in contact, liquid leaving the node on one layer is in part transferred to the adjoining layer, thus ensuring uniform mixing on adjoining layers at any nodal intersection. The layers are simple and inexpensive to make.

Other features and advantages of the invention will be apparent from the following description of the preferred embodiment, and from the claims.

BRIEF DESCRIPTION OF THE DRAWINGS

We first briefly describe the drawings.

DESCRIPTION OF THE PREFERRED EMBODIMENTS

Figure 1:
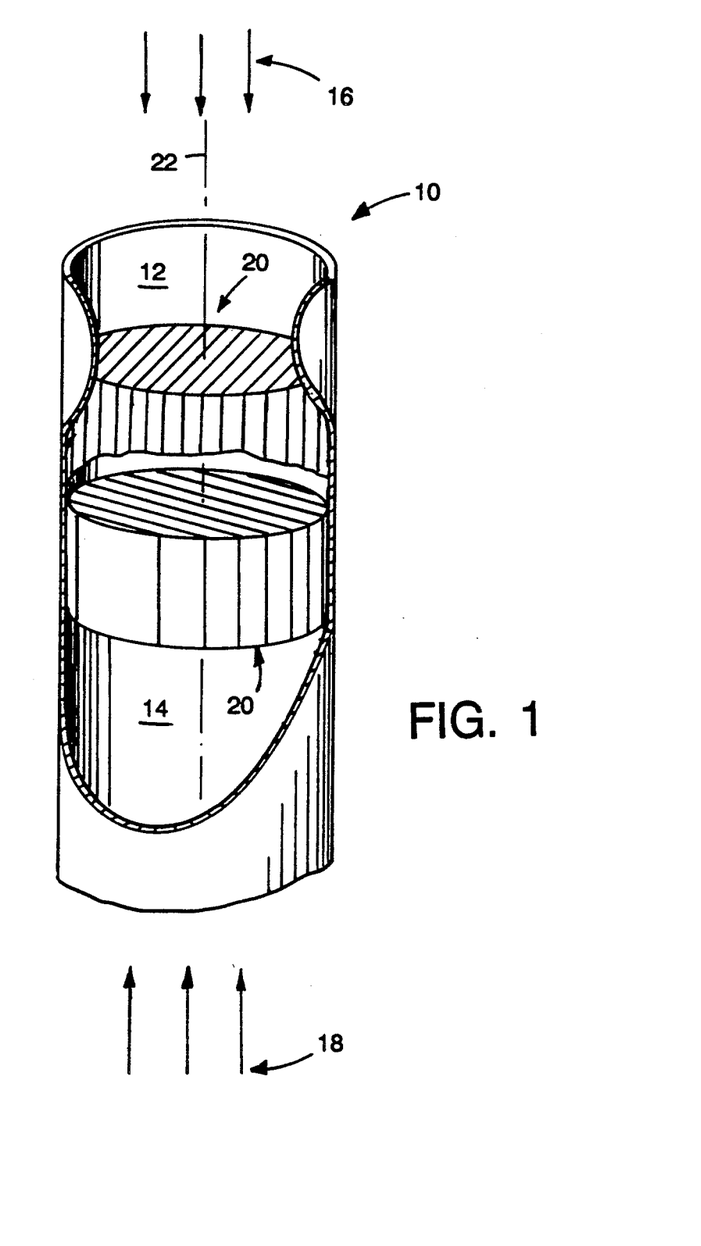
FIG. 1 is an isometric view, partially cut away, of a reaction chamber containing a stack of packing elements.

Referring to FIG. 1, a generally cylindrical reaction chamber 10 (e.g., a washing column or a distilling tower) carries two fluid streams 12, 14 that are meant to be mixed and to react within chamber 10. Fluid stream 12 (e.g., a liquid) is introduced into chamber 10 by a sprayer (not shown) and falls in a predominant direction of flow 16. A reboiler (also not shown) introduces fluid stream 14 (e.g., a gas), which rises in the opposite predominant direction of flow 18. A stack of identical, generally cylindrical packing elements 20 (of which two are shown) inside chamber 10 enhance the mixing of and reaction between fluid streams 12, 14 in a manner described in detail below. The vertical axis 22 of each packing element 20 is aligned with the predominant flow directions 16, 18.

Figure 2:
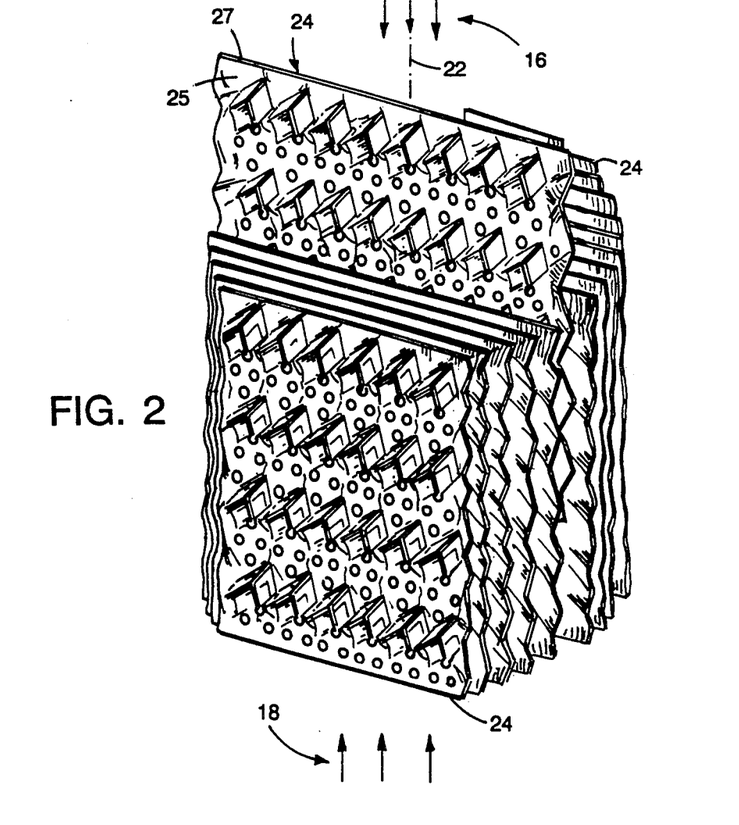
FIG. 2 is an isometric, partially cut away view of a representative packing element of FIG. 1, with one layer of the packing element partially withdrawn.
Figure 3:
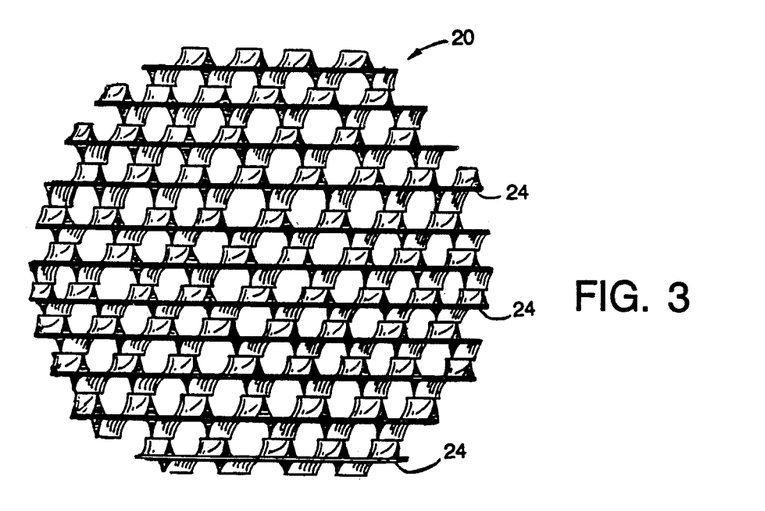
FIG. 3 is a top view of the packing element of FIG. 1 showing the first rows of deflection surfaces of layers according to a first embodiment of the invention.

Referring also to FIGS. 2 and 3, each packing element 20 includes a series of layers 24, each in contact with adjacent layers 24. All layers 24 have the same height and thickness, but the width of layers 24 varies as shown to make the overall shape of packing element 20 generally cylindrical to fit tightly within chamber 10. As shown in FIG. 1, the layers 24 of adjacent stacked packing elements 20 need not be angularly aligned with each other. Typically, adjacent packing elements 20 are placed in chamber 10 with their layers 24 perpendicular to each other. A pair of packing elements 20 can be fabricated as a unit (i.e., secured together), with the layers 24 of the constituent packing elements oriented at the desired angular relationship, and the unit installed in chamber 10. Adjacent units (or adjacent layers) can be keyed to ensure that the desired angular relationship is established.

Figure 4:
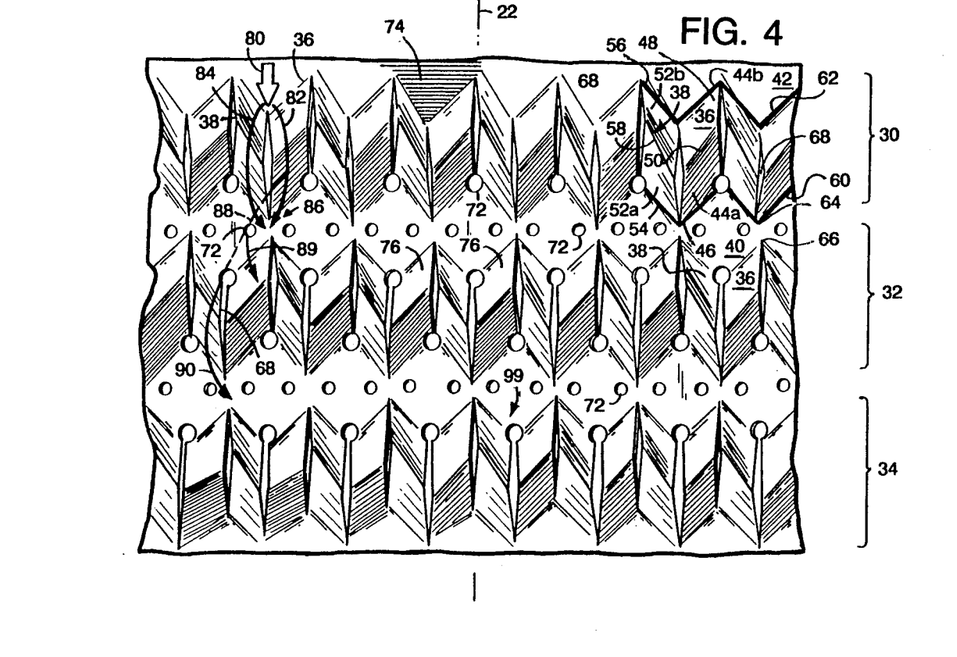
FIG. 4 is a front view of a packing element layer according to the first embodiment.
Figure 5:
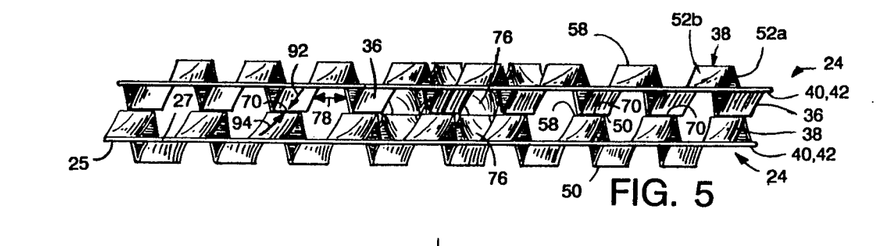
FIGS. 5 and 6 are top and side views of two layers of FIG. 4 in contact in a packing element.
Figure 6:
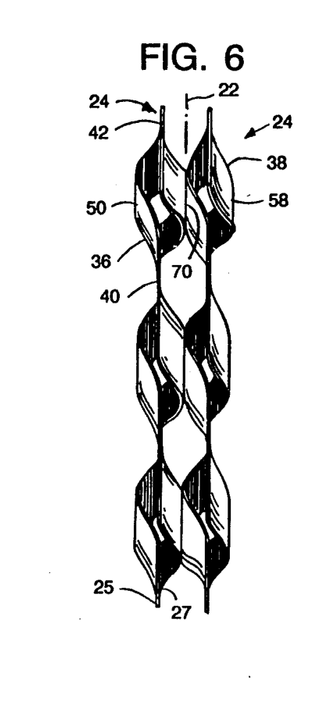

Referring to FIGS. 4–6, each layer 24 is formed from a single, flat sheet of metal in a manner described in detail below. Each layer 24 includes a number of parallel rows (only three rows 30, 32, 34 being shown) of alternating corrugations 36, 38, which project from flat surfaces 40, 42 of layer 24. Each row 30, 32, 34 is positioned generally along a line lying in the plane of flat surfaces 40, 42 and at a right angle to vertical axis 22.

Corrugations 36, 38 are oriented generally vertically and project in opposite directions with respect to the plane of flat surfaces 40, 42. Specifically, corrugations 36 protrude from the page in FIG. 4, while corrugations 38 project into the page in FIG. 4. Thus, in each row 30, 32, 34, alternating corrugations 36, 38 are disposed on either side of flat surfaces 40, 42.

Each corrugation 36 comprises a pair of symmetrical sloped surfaces 44a, 44b which are at equal angles with respect to flat surfaces 40, 42 and meet surfaces 40, 42 at respective line segments 46, 48. Sloped surfaces 44a, 44b meet each other at a fold 50 which is parallel to line segments 46, 48. Surfaces 44a, 44b are approximately equal in area (i.e., length and width). Line segments 46, 48 and fold 50 are oriented obliquely with respect to vertical axis 22, and thus so is each corrugation 36.

Each corrugation 38 includes a pair of symmetrical sloped surfaces 52a, 52b which are at equal angles with respect to flat surfaces 40, 42 and meet surfaces 40, 42 at line segments 54, 56, respectively. Sloped surfaces 52a, 52b meet each other at a fold 58, which is parallel to line segments 54, 56. The areas (i.e., length and width) of surfaces 52a, 52b essentially equal one another. Line segments 54, 56 and fold 58 are obliquely oriented with respect to vertical axis 22 oppositely to the orientation of line segments 46, 48 and fold 50. Thus, it follows that corrugations 36, 38 are oriented in opposite oblique directions to vertical axis 22 (and hence to directions of flow 16, 18, FIG. 1).

Adjacent line segments 46, 54 on flat surface 40 form a succession of W shapes, for example, W shape 60 (highlighted in FIG. 4 for clarity). Similar W shapes are formed by adjacent line segments 48, 56 on flat surface 42, one of which, W shape 62, is highlighted for clarity.

Adjacent rows of corrugations 36, 38 (e.g., rows 30, 32) are aligned relative to each other so that the downward vertices 64 of the W shapes 60, 62 in row 30 oppose and nearly meet the upward vertices 66 of the W shapes (not numbered) in adjacent row 32. Thus, the W shapes of successive rows are staggered horizontally.

Slits 68 are formed between adjacent corrugations 36, 38 as the corrugations are made (as discussed below). As shown in FIG. 4, adjacent slits 68 in each row (e.g., row 30) are vertically offset from each other.

Adjacent layers 24 are positioned in packing element 20 so that corrugations 36 of a layer 24 contact corrugations 38 of the next adjacent layer 24. More specifically, folds 50 of corrugations 36 of one layer 24 contact folds 58 of corrugations 38 of the adjacent layer 24 at nodes 70. Because abutting corrugations 36, 38 of adjacent layers 24 are oriented in opposite oblique directions with respect to vertical axis 22, folds 50, 58, respectively, of these abutting corrugations form an "X", with node 70 being the center point of the "X". Folds 50, 58 are oriented with respect to each other at an angle between about 60° and 150°, most preferably at an angle of 90°. This angle is bisected by vertical axis 22.

Rows of circular holes 72 are also provided in layer 24. Both sides 25, 27 of layer 24 bear fine fluting 74 (only a small, representative portion of which is shown) that is oriented perpendicularly to vertical axis 22, and thus disposed at right angles to predominant directions of flow 16, 18 (FIG. 1).

Because the successive rows 30, 32, 34 of corrugations 36, 38 are horizontally staggered, when packing element 20 is viewed from the top (FIG. 5) the sloped surfaces of the corrugations of row 32 (e.g., surfaces 76) lie in the open gaps 78 left by successive corrugations that protrude from layer 24 in the same direction (e.g., corrugations 36 in row 30). For clarity, only a few representative corrugation surfaces 76 of row 32 are shown in FIG. 5. Thus, substantially all of the available paths in predominant directions of flow 16, 18 are obstructed by deflection surfaces, that is, surfaces (like surfaces 44a, 44b, 52a, 52b, and 76) that are oriented obliquely with respect to vertical axis 22.

MANUFACTURE

Layers 24 are made by forming slits 68 and circular holes 72 in sheet metal in which fluting 74 has already been formed. Slits 68 and holes 72 can be made by any suitable technique, such as stamping or cutting (e.g., with a laser). The sheet metal may alternatively be passed through suitably configured gears to cut slits 68.

Then, any suitable method is used to form corrugations 36, 38, such as stamping the sheet metal in a suitable die or applying the sheet metal through suitably configured gears. The symmetry of the corrugations 36, 38 in each row, and the repeating nature of rows 30, 32, 34 allows for a straightforward arrangement of gears to produce layer 24. The gears include teeth or other fixtures to hold the sheet metal in place as it traverses the gears to prevent walking.

Packing elements 20 are assembled by securing the required number of layers 24 together in any suitable way, such as with one or more bands of, e.g., steel, placed around the layers. Alternatively, layers 24 can be held together with one or more rivets that are passed perpendicularly through all of the layers.

OPERATION

Referring to FIGS. 1-6, as liquid 12 falls through reaction chamber 10 in predominant flow direction 16, it passes down through successive stacked packing elements 20. Likewise, gas 14 rises through stacked packing elements 20.

Considering falling liquid 12, different portions of the liquid pass over different surfaces of layers 24, which impart to these different portions of liquid components of momentum in directions that differ from (and that are preferably normal to) predominant flow direction 16. Then these different portions of liquid are recombined on layers 24 with a tendency to cancel the different components of momentum. This significantly adds to the efficiency of mixing liquid 12 and fluid 14.

More specifically, as liquid 12 flows down each surface (e.g., surface 25 of layer 24 in FIG. 4) a large wetted area is produced, and corrugations 36, 38 continually split the liquid into portions that have the different components of sideways momentum and recombine the split components in such a way as to cause the opposite momenta to cancel. This creates added turbulence, aiding the mass transfer between gas 14 and the liquid 12.

For example, as a stream 80 of liquid 12 flows over surface 25, it is split into portions 82, 84 by a pair of the corrugations 36, 38 in row 30. Surfaces 44b and 52b, respectively, of corrugations 36, 38 impart opposite components of sideways momentum to liquid portions 82, 84 because surfaces 44b and 52b are oriented in opposite (diverging) oblique directions with respect to vertical axis 22. As liquid portions 82, 84 traverse folds 50, 58, corrugation surfaces 44a, 52a (respectively) reverse the directions of momenta of portions 82, 84 to cause them to meet in area 86 and cancel their opposite sideways momenta. This creates turbulence in that area, thereby aiding the desirable mixing between liquid 12 and gas 14.

In addition, corrugations 36, 38 cause some of the liquid 12 that is flowing on one side (e.g., on surface 25) of a layer 24 to be transferred to the other surface 27 of that layer where it is mixed with liquid already flowing on surface 27. Later, some of the liquid on surface 27 is transferred back to surface 25 (of the same layer) by a downstream corrugation. This is shown in FIG. 4 by a portion 88 of liquid branch 82 that flows through slit 68 and passes over the opposite surface 27 of layer 24. Some 89 of liquid portion 88 re-passes to surface 25 via hole 72. Another portion 90 is transferred back to surface 25 by dripping through another hole 72 or through one or more slits 68 in the next row 32 of corrugations. Thus, it is seen that corrugations 36, 38 (and to a certain extent holes 72) cause the continual transfer of portions of liquid 12 between surfaces 25, 27 of each layer 24. This further enhances mixing efficiency by splitting and recombining portions of liquid 12 on the surfaces 25, 27.

Another way that packing element 20 significantly assists in the mixing process is by mixing, at nodes 70, portions of liquid 12 that are flowing down opposing surfaces of adjacent layers 24. This is best illustrated in FIG. 5. A portion 92 of liquid 12 that flows down the sloped upper surface 44b of corrugation 36 on surface 25 of one layer 24 is imparted with a component of sideways momentum (i.e., to the left in FIG 5). A portion 94 of liquid 12 flowing down the other surface 27 of adjacent layer 24 is imported with sideways momentum in the opposite direction (i.e., to the right in FIG. 5) by the sloped upper surface 52b of corrugation 38. Some of these different descending portions 92, 94 meet at node 70, causing their opposite sideways momenta to be canceled; the turbulence introduced at node 70 aids in mixing.

This arrangement of surfaces in packing elements 20 reduces channeling of fluids 12, 14 by providing frequent changes of flow direction and multiple flow parts of nearly equal flow resistance between points. Liquid 12 flows and gas 14 flows are continually combined, split, and recombined at at least three different levels: (1) on each surface 25, 27 of each layer by the opposite sideways components of momenta imparted by adjacent corrugations; (2) on opposite surfaces of each layer with the assistance of vertical slits 68 (and holes 72); and (3) between adjacent layers 24 by contact between offset corrugations 36, 38 at nodes 70, which provides for interchange in mixing between adjacent layers.

OTHER EMBODIMENTS

Other embodiments are within the scope of the claims.

For example, the corrugations need not be oriented generally vertically in rows (as in FIG. 4), but may instead be generally oriented horizontally and arranged in columns.

Figure 7:
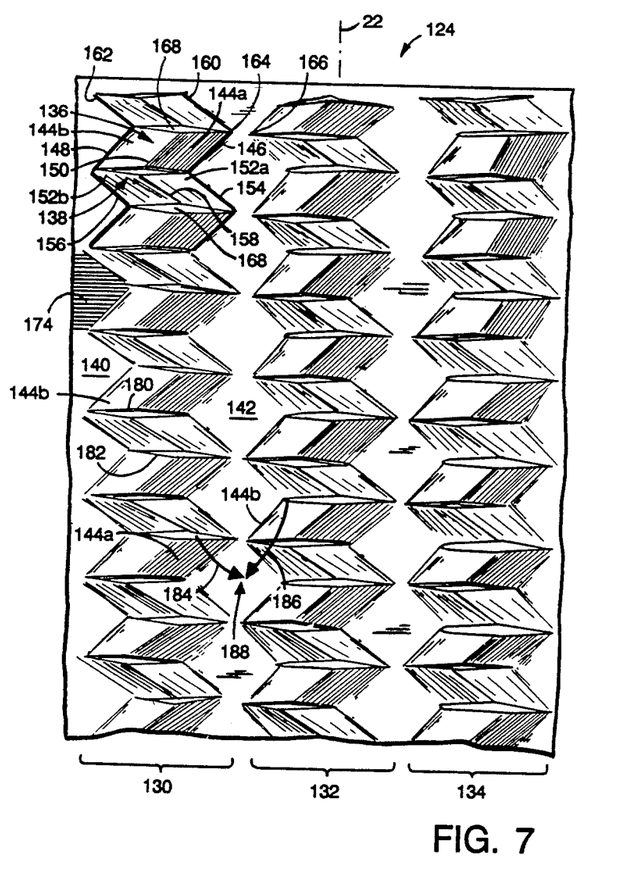
FIG. 7 is a front view of a packing element layer according to a second embodiment of the invention.
Figure 8:
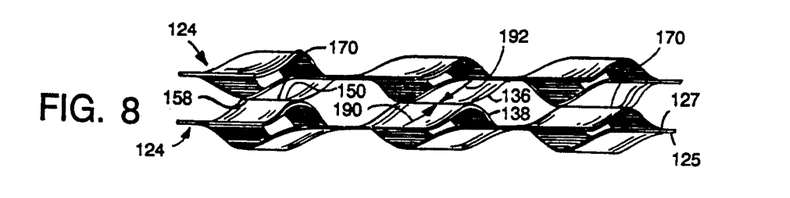
FIGS. 8 and 9 are top and side views of two layers of FIG. 7 in contact in a packing element.
Figure 9:
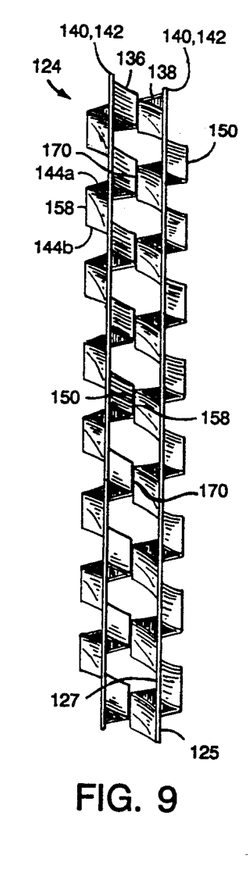

Referring to FIGS. 7-9, packing element layer 124 includes a number of parallel vertical columns (only three columns 130, 132, 134 being shown) of alternating corrugations 136, 138, which project from flat surfaces 140, 142 Of layer 124. Each column 130, 132, 134 is positioned generally along a line lying in the plane of flat surfaces 140, 142 and parallel to vertical axis 22.

Corrugations 136, 138 are oriented generally horizontally and project in opposite directions with respect to the plane of flat surfaces 140, 142. That is, corrugations 136 protrude from the page in FIG. 7, while corrugations 138 project into the page in FIG. 7. Thus, in each column 130, 132, 134 alternating corrugations 136, 138 are disposed on either side of flat surfaces 140, 142.

Each corrugation 136 comprises a pair of symmetrical sloped surfaces 144a, 144b which are disposed at equal angles with respect to flat surfaces 140, 142 and meet surfaces 140, 142 at respective line segments 146, 148. The areas (i.e., length and width) of surfaces 144a, 144b are approximately equal to each other. Sloped surfaces 144a, 144b meet each other at a fold 150 which is parallel to line segments 146, 148. Line segments 146, 148 and fold 150 are oriented obliquely with respect to vertical axis 22, and thus so is each corrugation 136.

Each corrugation 138 includes a pair of symmetrical sloped surfaces 152a, 152b which are disposed at equal angles with respect to flat surfaces 140, 142 and meet surfaces 140, 142 at line segments 154, 156, respectively. Sloped surfaces 152a, 152b meet each other at a fold 158, which is parallel to line segments 154, 156. Surface 152a is equal in area (i.e., length and width) to surface 152b. Line segments 154, 156 and fold 158 are obliquely oriented with respect to vertical axis 22 oppositely to the orientation of line segments 146, 148 and fold 150. Thus, it follows that corrugations 136, 138 are oriented in opposite oblique directions to vertical axis 22 (and hence to directions of flow 16, 18, FIG. 1).

Adjacent line segments 146, 154 on flat surface 142 form a succession of W shapes, for example, W shape 160 (highlighted in FIG. 7 for clarity). Similar W shapes are formed by adjacent line segments 148, 156 on flat surface 140, one of which, W shape 162, is highlighted for clarity.

Adjacent columns of corrugations 136, 138 (e.g., columns 130, 132) are aligned relative to each other so that the downward vertices 164 of the W shapes 160, 162 in column 130 oppose and nearly meet the upward vertices 166 of the W shapes (not numbered) in adjacent column 132. Thus, the W shapes of successive columns are staggered vertically.

Slits 168 are formed between adjacent corrugations 136, 138 as the corrugations are made (as discussed above). As shown in FIG. 7, adjacent slits 168 in each column (e.g., column 130) are horizontally staggered.

Adjacent layers 124 are positioned in packing element 20 (FIG. 2) so that corrugations 136 of a layer 124 contact corrugations 138 of the next adjacent layer 124. More specifically, folds 150 of corrugations 136 of one layer 124 contact folds 158 of corrugations 138 of the adjacent layer 124 at nodes 170. Because abutting corrugations 136, 138 of adjacent layers 124 are oriented in opposite oblique directions with respect to vertical axis 22, folds 150, 158, respectively, of these abutting corrugations form an "X", with node 170 being the center point of the "X". Folds 150, 158 are oriented with respect to each other at an angle between about 30° and 120°, most preferably at an angle of 90°. Vertical axis 22 bisects this angle.

Both sides 125, 127 of layer 124 bear fine fluting 174 (only a small, representative portion of which is shown) that is oriented perpendicularly to vertical axis 22, and thus disposed at right angles to predominant directions of flow 16, 18 (FIG. 1).

In Operation, as liquid 12 falls through each packing element 20 (FIG. 1), streams of the liquid flow down each surface 125, 127 of each layer 124 in continuous contact with layer 124, following "zig-zag" courses defined by corrugations 136, 138. Portions of the liquid that flow down two sides of a corrugation (e.g., the two sides of sloped surface 144b of a corrugation 136) will flow or drip off of the lower edge 180 of the corrugation and impact the layer 124 a short distance downstream (e.g., on the upper edge 182 of a downstream corrugation 136). The surface 125, 127 of the layer 124 on which the liquid ends up depends in part on whether it drips from an outwardly projecting corrugation 136 or an inwardly protruding corrugation 138.

Thus it is seen that on each layer 124 corrugations 136, 138 continually divide and recombine liquid 12 flowing down surfaces 125, 127 of that layer 124 by continually transferring the liquid from one surface (e.g., surface 125) to the other (i.e., surface 127).

In addition, the sloped surfaces of corrugations 136, 138 impart different components of sideways momentum to different portions of liquid that flow over them, and cause these different portions of the liquid to be continually recombined so as to cancel the different components of momentum. For example, sloped surface 144a of a corrugation 136 in column 130 causes portion 184 of the flowing liquid to have a sideways momentum component directed to the right in FIG. 7 (when viewed with axis 22 oriented vertically). Sloped surface 144b of a corrugation 136 in column 132 imparts flowing liquid portion 186 with a sideways component of momentum directed to the left. When some of portions 184, 186 meet in area 188, their sideways momentum components cancel, thereby generating mixing assisting turbulence.

The liquid is also mixed by adjacent packing elements 124, as is best shown in FIG. 8. For example, a portion 190 of liquid that flows down the upper sloped surface of a corrugation 138 on one layer 124 is imparted with a component of sideways momentum that is opposite to the momentum component that an abutting corrugation 136 on adjacent layer 124 imparts to another portion 192 of the liquid. When some of portions 190, 192 meet at node 170, their sideways momentum components cancel and they are mixed (with themselves and with gas 14). Also, some of the liquid that drips from a lower edge of a corrugation (e.g., edge 180) impacts the opposing surface of the adjacent layer 124 and is mixed with the liquid flowing down that surface.

Thus, the liquid is continually mixed both in the plane of each layer 124 and perpendicularly to layer 124 through the volume of packing element 20. The frequent changes in flow direction caused by the corrugations impede the liquid from channeling in a single direction (as often occurred with prior schemes). Also, corrugations 136, 136 preferably are arranged to provide an equal number of oppositely angled surfaces (e.g., sloped surfaces 144a, 144b) on each surface 125, 127 of each layer 124. This promotes uniform liquid wetting over the entire layer 124, even for end layers 124 of packing element 20 that face the wall of tower 10.

The horizontal orientation of slits 168 assists the vertical flow of gas 14 through packing element 20. This increases the throughput and lowers the pressure drop of the gas. Horizontal slits 168 promote gas mixing by causing the gas to alternately flow over opposite surfaces 125, 127 of each sheet. Corrugations 136, 138 also continually divert the direction of flow of gas 14 in a similar ziq zag pattern as that discussed above for liquid 12. As a result, gas 14 is also efficiently mixed in the plane of each layer 124 and throughout the volume of packing element 20.

Referring again to FIG. 7, layer 124 is shown as omitting circular holes (e.g. holes 72 as in FIG. 4) which, if present, would permit additional portions of the liquid that flow between adjacent columns of corrugations (e.g., columns 132, 134) to be transferred back and forth between surfaces 125, 127. However, they are not necessary for mixing. Omitting the holes provides a larger surface area on each layer 124 for mass transfer, which may increase mixing efficiency.

As is the case with fine fluting 74 in the embodiment shown in FIG. 3, fine fluting 174 assists in the mixing process by intercepting and interrupting (i.e., slowing down) liquid 12 and gas 14 as they flow over surfaces 125, 127.

Figures 10, 10A:
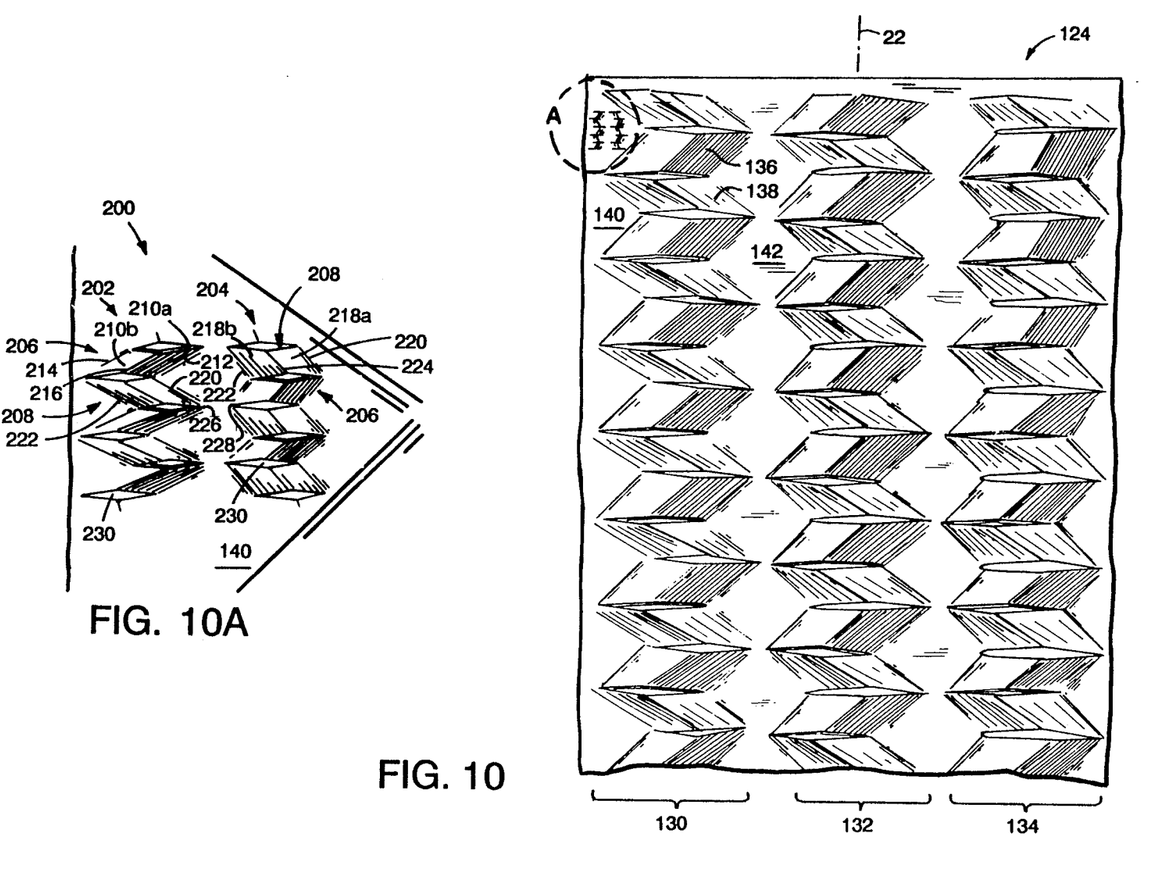
FIG. 10 is a front view of a packing element layer according to a third embodiment of the invention.
FIG. 10A is an exploded view of the portion of FIG. 10 encircled by dashed line A.

Referring to FIGS. 10 and 10A, fine fluting 174 (and fine fluting 74 in FIG. 4) can be replaced with an array 200 of small scale, horizontally oriented corrugations (only a small, representative portion of which is shown) that have the same general configuration as corrugations 136, 138. Array 200 covers both surfaces 125, 127 and includes multiple columns (only columns 202, 204 being shown) of alternating outwardly projecting corrugations 206 (i.e., corrugations that project from surfaces 140, 142 in the same direction as major corrugations 136) and inwardly protruding corrugations 208 (that protrude in the same direction as major corrugations 238).

Each corrugation 206 includes a pair of sloped surfaces 210a, 210b that form equal angles with flat surface 140 and meet surface 140 at line segments 212, 214, respectively. Sloped surfaces 210a, 210b meet each other at a fold 216 that is parallel to line segments 212, 214. Each corrugation 208 comprises a pair of sloped surfaces 218a, 218b that form equal angles with flat surface 140 and meet surface 140 at line segments 220, 222 Sloped surfaces 218a, 218b meet each other along fold 224, which is parallel to line segments 220, 222. Surfaces 210a, 210b are equal in area, as are surfaces 218a, 218b.

Small scale corrugations 206, 208 are about one-quarter of the size of major corrugations 136, 138. The scale of corrugations 206, 208 can be made smaller at the expense of increased fabrication complexity.

Like major corrugations 136, 138, the adjacent line segments (e.g., line segments 212, 220) on flat surface 140 form a succession of W shapes. Similar W shapes are formed by the other adjacent line segments of corrugations 206, 208 (e.g., segments 214, 222). The corrugations 206, 208 of adjacent columns (e.g., columns 202, 204) are offset vertically so that the downward vertices 226 of the W shapes in column 202 oppose and nearly meet the upward W vertices 228 of column 204.

Small scale array 200 is formed prior to forming corrugations 136, 138 using any suitable technique (e.g., gearing that is suitably scaled). During the formation of array 200, small scale horizontal slits 230 are formed and are disposed between adjacent fine scale corrugations 206, 208.

The folds 216, 224 of the small scale corrugations are oriented with respect to each other at preferably the same angle as that defined by folds 150, 158 (i.e., between 30° and 120°, most preferably at 90°). But this angular relationship is not required.

The small scale slits 230 improve efficiency by intercepting and interrupting gas and liquid flows, causing both to continually be transferred between surfaces 125, 127. Corrugations 206, 208 perform the same sideways momentum imparting and canceling function on each layer 124 as is performed by major corrugations 136, 138 (albeit on a smaller scale).

Figure 11:
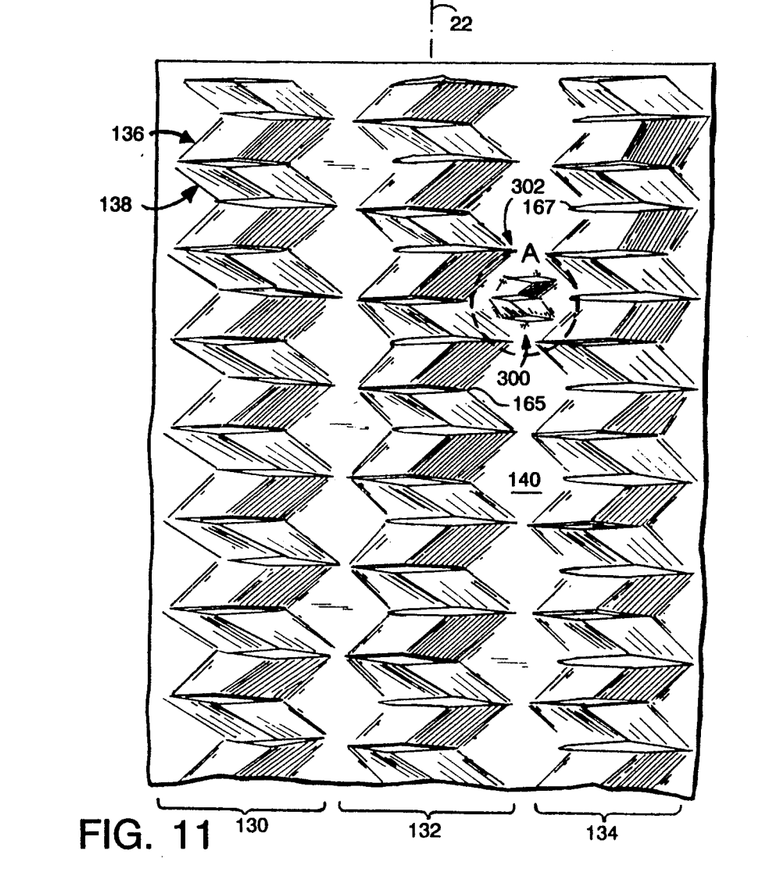
FIG. 11 is a front view of a packing element layer according to a fourth embodiment of the invention.
Figure 11A:
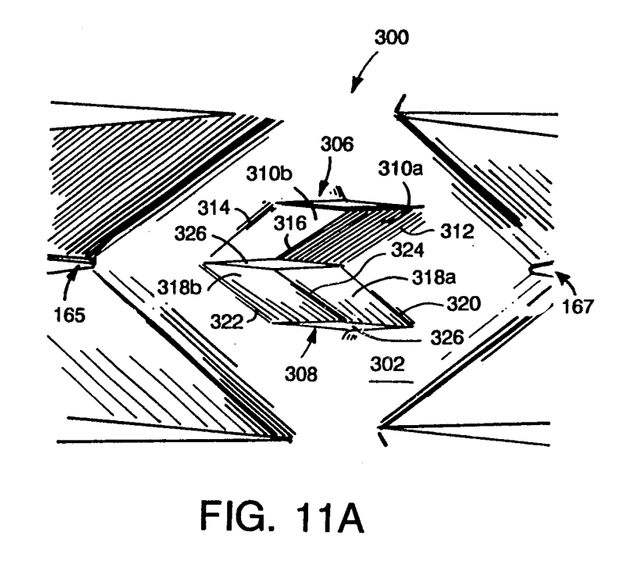
FIG. 11A is an exploded view of the portion of FIG. 11 encircled by dashed line A.

Referring to FIGS. 11 and 11A, an array 300 of corrugations may be disposed in the diamond-shaped areas 302 between adjacent columns of corrugations 136, 138 (e.g., columns 132, 134). Only a small, representative portion of array 300 is shown.

Within each diamond shaped area 302, a pair of corrugations 306, 308 are formed that are about one-half the size of major corrugations 136, 138. Corrugation 306 (like major corrugations 136) projects from flat surface 140, while corrugation 308 protrudes into flat surface 140 in the opposite direction (like major corrugations 138).

Each corrugation 306 includes a pair of sloped surfaces 310a, 310b that meet flat surface 140 at parallel line segments 312, 314, respectively, and that meet each other at a parallel fold 316. Each corrugation 308 has a pair of sloped surfaces 318a, 318b that meet flat surface 140 at line segments 320, 322, respectively, which are parallel to a fold 324 at which surfaces 318a, 318b meet. Surfaces 310a, 310b are equal in area, as are surfaces 318a, 318b. Surfaces 310a, 310b make equal angles with surfaces 140, as do surfaces 318a, 318b.

Line segments 312, 320 form a V shape that is parallel to a V shape formed by line segments 314, 322. In the arrangement shown in FIG. 11A, the Vs are oriented so that the base of each V shape points in the same direction as the upward vertices 165 of the W shapes of column 132. Alternatively, corrugations 306, 308 can be formed so that their V shaped line segments point in the same direction as downward vertices 167 of the W shapes in column 134.

Horizontal slits 326 are disposed between corrugations 306, 308 and between the sides of corrugations 306, 308 and flat surface 140. Corrugations 306, 308 are manufactured according to any suitable technique, such as the gearing process discussed above.

The angle between folds 316, 324 is generally the same as that defined by folds 150, 158 of the major corrugations (i.e., between 30° and 120°, and preferably 90°), but this is not required.

The array 300 of half scale corrugations 306, 308 serves to prevent liquid and gas from channeling vertically between the columns (e.g., columns 130, 132, 134) and also cause the liquid and gas to be continually transferred between surfaces 125, 127. Thus, mixing efficiency is increased. Corrugations 306, 308 also impart and cancel sideways components of momentum to different portions of the liquid and gas flowing over the surfaces 125, 127 of each individual layer, as described above.

It may be desirable to omit fine fluting 174 (FIG. 7) or small scale corrugations 206, 208 (FIGS. 10, 10A) when array 300 of half scale corrugations 306, 308 is used.

The directions that corrugations 306, 308 protrude from flat surface 140 can be reversed so that corrugations 306 protrude in the same direction as major corrugations 138 and corrugations 308 project in the same direction as major corrugations 136. Moreover, the corrugations 306, 308 in different diamond-shaped areas 302 can be oriented differently.

Further, some (or all) of the half scale corrugations 306, 308 may be oriented vertically (as in FIG. 4) instead of horizontally. In that case, slits 326 would be parallel to vertical axis 22 and perpendicular to horizontal slits 168 (FIG. 7). Half scale corrugations 306, 308 may also be placed on layer 24 (FIG. 4) in the diamond-shaped areas 99 between adjacent rows of corrugations 36, 38.

The major corrugations need not be arranged in horizontal rows (as in FIG. 4) or vertical columns (as in FIG. 7), but may instead be arranged, e.g., in rows that are diagonal to vertical axis 22. In this case, one sloped surface of each corrugation is larger in area (i.e., length and width) than the other sloped surface of that corrugation. Taking corrugations 36, 38 (FIG. 4) as examples, with rows 30, 32, 34 oriented diagonally with respect to ais 22 (say, at 45°), surfaces 44b, 52b became longer (and thus larger in surface area) than the other surfaces 44a, 52a of the corrugations. Also, surfaces 44b, 52b make shallower angles with flat surface 42 than those formed between surfaces 44a, 52a and flat surface 40.

Figures 12, 12A, 12B:
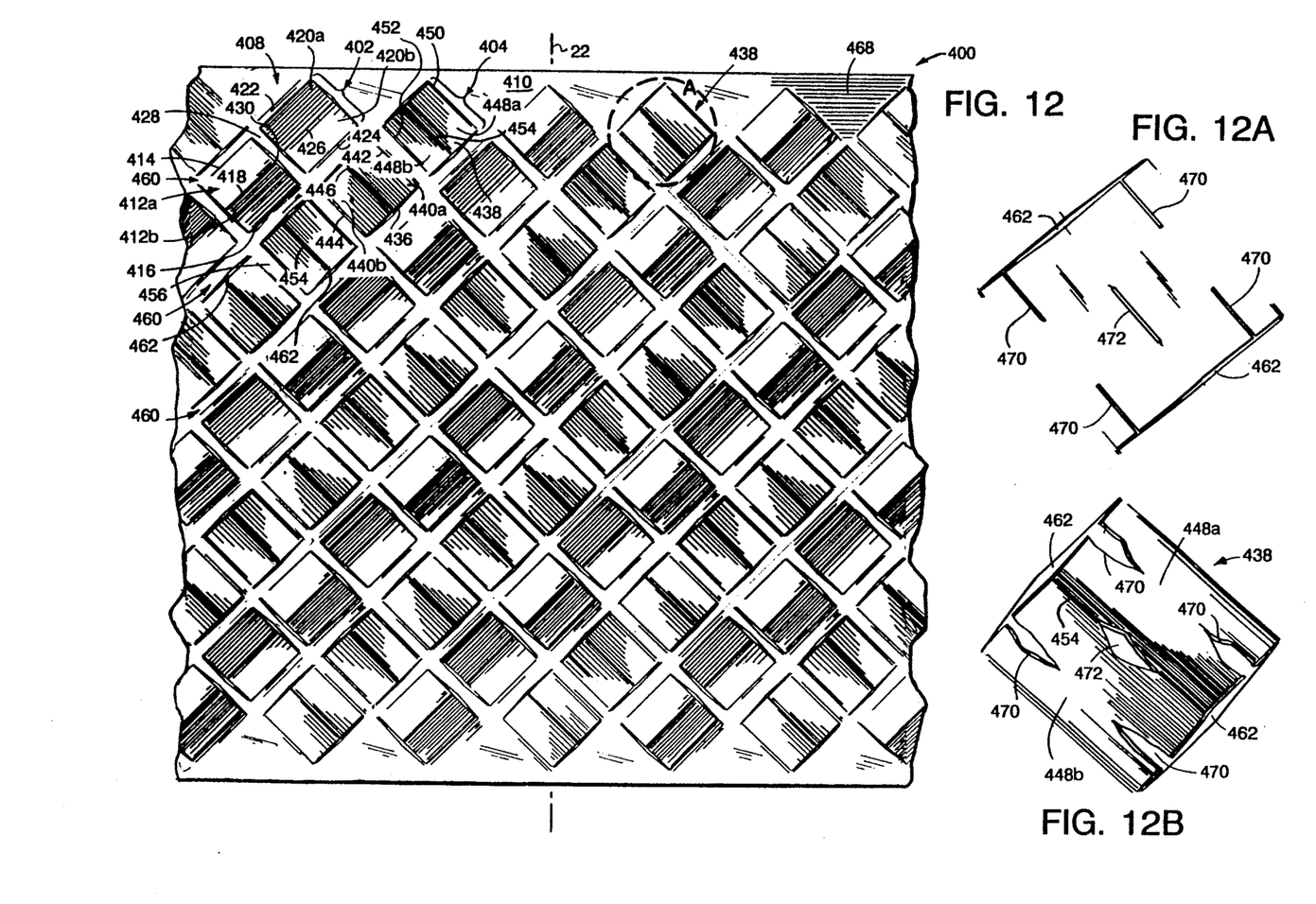
FIG. 12 is a front view of a packing element layer according to a fifth embodiment of the invention.
FIG. 12A is an exploded view of a region corresponding to the portion of FIG. 12 encircled by dashed line A, showing small slits that are formed before the encircled corrugation is formed.
FIG. 12B shows a corrugation formed in the region shown by FIG. 12A.

Referring to FIG. 12, in another embodiment packing element layer 400 includes alternating diagonal rows 402, 404 of corrugations. Rows 402, 404 are parallel and are disposed at an angle of 45° with respect to vertical axis 22.

Row 402 includes alternating corrugations 406, 408 that project in opposite directions from the flat surface 410 of layer 400. That is, corrugations 406 project from the page in FIG. 12 and corrugations 408 protrude into the page.

Each corrugation 406 includes a symmetrical pair of sloped surfaces 412a, 412b which are disposed at equal acute angles with respect to flat surface 410 and which meet surface 410 at respective parallel line segments 414, 416. Surfaces 412a, 412b meet each other at a fold 418 that is parallel to line segments 414, 416 and oriented obliquely (e.g., at 45°) with respect to axis 22.

Each corrugation 408 includes a symmetrical pair of sloped surfaces 420a, 420b that are oriented at equal acute angles with respect to flat surface 410. Surfaces 420a, 420b meet surface 410 at parallel line segments 422, 424, respectively, and meet each other at a fold 426 that is parallel to line segments 422, 424. Fold 426 and line segments 422, 424 are angled (e.g., at 45°) with respect to axis 22.

Corrugations 406, 408 are oriented in the same oblique direction with respect to vertical axis 22. That is, line segments 414, 416, 422, 424 and folds 418, 426 are all parallel. Corrugations 406, 408 are spaced from each other by a flat surface region 428 bounded by slits 430 that are formed in the process of making the corrugations.

Each row 404 includes alternating corrugations 436, 438 that project in opposite directions (outwardly and inwardly, respectively) from flat surface 410. Corrugations 436, 438 are oriented at right angles to corrugations 406, 408, as will be explained.

Each corrugation 436 includes a pair of symmetrical sloped surfaces 440a, 440b that meet flat surface 410 at parallel line segments 442, 444, respectively, and that meet each other at fold 446. Surfaces 440a, 440b define equal angles with respect to flat surface 410. Fold 446 is parallel to line segments 442, 444 and is oriented obliquely to vertical axis 22 (e.g. at 45°) in the opposite direction from fold 426 of corrugation 408. That is, folds 426, 446 (and hence corrugations 408, 436) are perpendicular to each other.

Each corrugation 438 comprises a pair of symmetrical sloped surfaces 448a, 448b that define equal angles with respect to flat surface 410. Surfaces 448a, 448b meet surface 410 along line segments 450, 452, respectively, and meet each other at fold 454, all of which are parallel. Fold 454 is oriented obliquely to vertical axis 22 (e.g., at 45°) in a direction opposite to that of fold 418 of corrugation 406. That is, folds 418, 454, and thus corrugations 406, 438, are perpendicular to each other.

Corrugations 436, 438 are oriented in the same oblique direction with respect to vertical axis 22. That is, line segments 442, 444, 450, 452 and folds 446, 454 are all parallel. Corrugations 436, 438 are spaced from each other by a region 456 of flat surface 410. Region 456 is bounded by a line segment of each adjacent corrugation (e.g., line segments 442, 452).

Adjacent rows 402, 404 of corrugations are spaced by another region 460 of flat surface 410 that runs parallel to rows 402, 404. On one side, region 460 is bounded by line segments of corrugations 406, 408. Slits 462 that are formed during the manufacture of corrugations 436, 438 bound the opposite side of flat region 460. Layer 400 also bears fine fluting 468 which is oriented horizontally.

In a packing element 24 (FIG. 1), adjacent layers 400 are arranged so that the folds of the corrugations of each row 402 of one layer meet the folds of the corrugations of each row 404 of the other layer at nodes (similar to nodes 70 in FIG. 5). The intersecting folds (e.g., folds 426, 446) form an "X" shape, with the node being the center point of the X. This arrangement is accomplished by placing adjacent sheets 400 in packing element 24 so that the front side (i.e., the side shown in FIG. 12) of each layer 400 faces a front side of an adjacent layer 400, and the back side of each layer 400 faces the back side of an adjacent layer.

In operation, the corrugations of rows 402, 404 impart opposite components of sideways momentum to liquid 12 as it flows along the surfaces of the layer. Flat regions 428, 456, and 460 provide areas for portions of liquid 12 having opposite components of sideways momentum to meet and cancel such opposite components. Also, liquid and gas are transferred between the sides of each layer 400 by slits 430, 462, thereby further promoting mixing. Portions of liquid 12 that meet at the nodes between adjacent layers have their opposite sideways momentum components cancelled, thereby generating mixing assisting turbulence. The opposite orientation of the corrugations in rows 402, 404 inhibits channeling and imparts additional changes in direction to flowing liquid and gas.

Referring to FIG. 12A, to reduce the stresses exerted on the material (e.g., aluminum) of layer 400, small secondary slits 470, 472 are formed (e.g., by stamping or gearing) prior to forming the corrugations 406, 408, 436, 438. Secondary slits 470 are located at each end of major slits 462 and are disposed at right angles thereto. Secondary slit 472 is formed in the region where the fold of the corrugation will be located. Secondary slits 470, 472 are made after major slits have been cut.

Referring to FIG. 12B, the corrugations (e.g., corrugation 438) are then formed using any of the techniques discussed above. Secondary slits 470, 472 expand as sloped surfaces 448a, 448b are pressed out of the plane of flat surface 410, thereby relieving stresses in the material that are induced by deforming layer 400. During operation, secondary slits 470, 472 increase liquid mixing by providing added passages between the sides of layer 400. Secondary slits 470, 472 also slightly reduce the surface area of layer 400 for mass transfer.

All of the packing element layers described above can be made of materials other than sheet metal. For example, gauze (i.e., textile fabrics) stiffened by interwoven metal wires, metallic fabric, or fiberglass can be used instead. The layers may also be made from ceramic material, which is molded to form the various corrugations, fluting, and openings. When circular holes 72 (FIG. 4) are used, they may be disposed as a matrix throughout the packing layer instead of in rows (i.e., disposed in, e.g., the sloped surfaces of the corrugations).

Packing elements 20 (FIG. 1) need not be cylindrical, but may instead be, e.g., cubical, depending on the shape of the interior of reaction chamber 10.

Also, it is not necessary that vertical axis 22 bisect the angle made by the folds of contacting major corrugations. Further, the pair of sloped surfaces of the various corrugations need not form equal angles with respect to the flat surfaces.

I claim:

1. A device for enhancing contact between a fluid having a predominant direction of flow and a second fluid, comprising
a layer of material including a flat portion lying in a plane generally aligned with said direction of flow, said layer having a series of fluid deflection surfaces each of which comprises a corrugation that projects from said flat portion out of said plane, adjacent corrugations in said series projecting in opposite directions from said plane of said flat portion, said series being positioned generally along a line lying in said plane and at an angle to said direction of flow, adjacent corrugations in said series being oriented at different oblique angles to said direction of flow.

2. The device of claim 1 wherein each deflection surface in said series meets said flat portion along a line segment, successive line segments forming a W shape.

3. The device of claim 2 wherein said line along which said series of deflection surfaces is arranged is parallel to said direction of flow so that said series is disposed generally along a vertical column with respect to said direction of flow.

4. The device of claim 3, wherein said layer comprises sheet metal.

5. The device of claim 3, wherein said layer comprises guaze.

6. The device of claim 3, wherein said layer comprises metallic fabric.

7. The device of claim 3, wherein said layer comprises fiberglass.

8. The device of claim 3, wherein said layer comprises a ceramic material.

9. The device of claim 3 wherein said adjacent deflection surfaces provide an opening through said layer in said plane.

10. The device of claim 3 further comprising a second series of deflection surfaces disposed generally along a vertical column parallel to said first series and separated from said first series of deflection surfaces by said flat portion.

11. The device of claim 10 wherein said second series is offset vertically with respect to said first series so that a straight line drawn perpendicular to the direction of flow through said device intersects a center of said W shape in one of said series and intersects another part of said W shape in said second series.

12. The device of claim 11 wherein said deflection surfaces have a generally V-shaped cross section when sectioned perpendicular to said direction of flow.

13. The device of claim 12 wherein said deflection surfaces have a fold at the base of the V shape.

14. The device of claim 13 wherein said fold is oriented obliquely to said direction of flow.

15. The device of claim 14 further comprising a plurality of said layers constructed to be disposed adjacent to each other with the folds of said deflection surfaces of one said layer that project in one direction contacting the folds of said deflection surfaces of an adjacent layer that project in the opposite direction at a plurality of nodes.

16. The device o claim 15 wherein said contacting folds are oriented at an angle to each other to define an X shape.

17. The device of claim 16 wherein said direction of flow bisects said angle.

18. The device of claim 16 wherein said angle between said contacting folds is between 30° and 120°.

19. The device of claim 18 wherein said angle is 90°.

20. The device of claim 3 wherein said layer includes at least one aperture.

21. The device of claim 3 wherein surfaces of said layer are finely fluted in a direction orthogonal to said direction of flow.

22. The device of claim 21 wherein the fine fluting is disposed on said flat portion and said deflection surfaces.

23. A reaction chamber for mixing a fluid having a predominant direction of flow and a second fluid, comprising
a plurality of packing elements for enhancing said mixing,
each packing element comprising a plurality of adjacently disposed layers, each layer in each packing element being disposed generally in a plane aligned with said direction of flow,
each layer including a flat portion lying in a plane aligned with said direction of flow, and
each layer having a series of fluid deflection surfaces each of which comprises a corrugation that projects from said flat portion out of said plane, adjacent corrugations in said series projecting in opposite directions from said plane of said flat portion, said series being positioned generally along a line lying in said plane and at an angle to said direction of flow, adjacent corrugations in said series being oriented at different oblique angles to said direction of flow.

24. The reaction chamber of claim 23 wherein said line is arranged parallel to said direction of flow.

25. The reaction chamber of claim 24 wherein each deflection surface in said series meets said flat portion along a line segment, successive line segments forming a W shape.

26. The reaction chamber of claim 23 wherein adjacent ones of said packing elements are disposed in said reaction chamber so that the plane of the layers of one of said packing elements is at a predetermined orientation to the plane of the layers of the adjacent packing element.

27. The reaction chamber of claim 26 wherein said predetermined orientation is perpendicular.

28. The reaction chamber of claim 26 wherein an adjacent pair of said elements are secured together for installation in said reaction chamber.

* * * * *